(12) United States Patent
Segawa et al.

(10) Patent No.: US 10,703,368 B2
(45) Date of Patent: Jul. 7, 2020

(54) HYBRID VEHICLE

(71) Applicant: TOYOTA JIDOSHA KABUSHIKI KAISHA, Toyota-shi, Aichi-ken (JP)

(72) Inventors: Taku Segawa, Susono (JP); Seiji Kuwahara, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 133 days.

(21) Appl. No.: 16/015,991

(22) Filed: Jun. 22, 2018

(65) Prior Publication Data
US 2019/0009781 A1 Jan. 10, 2019

(30) Foreign Application Priority Data
Jul. 10, 2017 (JP) ................ 2017-134772

(51) Int. Cl.
*B60W 30/18* (2012.01)
*B60K 6/387* (2007.10)
*B60K 6/40* (2007.10)
*B60W 20/40* (2016.01)
*B60W 20/10* (2016.01)
(Continued)

(52) U.S. Cl.
CPC ....... *B60W 30/18027* (2013.01); *B60K 6/387* (2013.01); *B60K 6/40* (2013.01); *B60K 6/448* (2013.01); *B60W 10/02* (2013.01); *B60W 10/06* (2013.01); *B60W 10/08* (2013.01); *B60W 20/00* (2013.01); *B60W 20/10* (2013.01); *B60W 20/40* (2013.01); *B60K 2006/4808* (2013.01); *B60K 2006/4825* (2013.01); *B60W 2510/0208* (2013.01); *B60W 2540/10* (2013.01); *B60W 2540/103* (2013.01); *B60W 2540/12* (2013.01);
(Continued)

(58) Field of Classification Search
CPC ........... B60W 30/18027; B60W 10/02; B60W 10/06; B60W 10/08; B60W 20/00; B60W 20/10; B60W 20/40; B60W 2510/0208; B60W 2540/10; B60W 2540/103; B60W 2540/12; B60W 2710/024; B60W 2710/0666; B60W 2710/083; B60K 6/387; B60K 6/40; B60K 6/448; B60K 2006/4808; B60K 2006/4825
See application file for complete search history.

(56) References Cited

U.S. PATENT DOCUMENTS

| 2004/0009842 A1 | 1/2004 | Inada |
| 2015/0298690 A1 | 10/2015 | Onouchi et al. |
| 2016/0121877 A1* | 5/2016 | Hancock ................. B60K 6/48 477/5 |

FOREIGN PATENT DOCUMENTS

| JP | 2004-48866 A | 2/2004 |
| JP | 2005323481 A * | 11/2005 |

(Continued)

*Primary Examiner* — Aaron L Troost
(74) *Attorney, Agent, or Firm* — Oliff PLC

(57) ABSTRACT

A hybrid vehicle without having a torque converter that can be launched rapidly and accelerated sharply in a WOT condition. The hybrid vehicle comprises a motor operated by an engine torque to generate electricity, and a clutch for selectively transmitting power between the first motor and drive wheels. The hybrid vehicle is launched by engaging the clutch to deliver the engine torque to the drive wheels. A torque absorbing control is executed to reduce the engine torque delivered to the clutch by operating the motor by the torque of the engine, when the clutch is disengaged and an accelerator pedal is depressed.

8 Claims, 7 Drawing Sheets

(51) Int. Cl.
*B60W 10/02* (2006.01)
*B60W 10/06* (2006.01)
*B60W 10/08* (2006.01)
*B60K 6/448* (2007.10)
*B60W 20/00* (2016.01)
*B60K 6/48* (2007.10)

(52) U.S. Cl.
CPC ............... *B60W 2710/024* (2013.01); *B60W 2710/0666* (2013.01); *B60W 2710/083* (2013.01)

(56) References Cited

FOREIGN PATENT DOCUMENTS

| | | |
|---|---|---|
| JP | 2013-103537 A | 5/2013 |
| JP | 2017-47733 A | 3/2017 |
| WO | 2014/051107 A1 | 4/2014 |

* cited by examiner

→ Torque
┄┄▶ Electricity

HYBRID VEHICLE

CROSS REFERENCE TO RELATED APPLICATIONS

The present disclosure claims the benefit of Japanese Patent Application No. 2017-134772 filed on Jul. 10, 2017 with the Japanese Patent Office, the disclosure of which are incorporated herein by reference in its entirety.

BACKGROUND

Field of the Disclosure

Embodiments of the present disclosure relate to the art of a hybrid vehicle having an engine and a motor-generator.

Discussion of the Related Art

JP-A-2013-103537 describes a drive control system for a hybrid vehicle. The hybrid vehicle taught by JP-A-2013-103537 comprises an engine, a motor-generator, an automatic transmission, a torque converter having a lockup clutch, a clutch that selectively interrupts torque transmission between the engine and the motor-generator and a starting clutch that selectively interrupts torque transmission between an input shaft of the automatic transmission and an output shaft. According to the teachings of JP-A-2013-103537, the hybrid vehicle is launched by so-called "friction start" in which the vehicle is launched while partially engaging a lockup clutch.

Generally, in a vehicle equipped with an automatic transmission, a torque converter as a launching device is provided between the engine and the automatic transmission to multiply an output torque of the engine in the low-speed range. In addition, the torque converter as a fluid coupling allows the vehicle to launch smoothly while generating creep torque. On the other hand, in a vehicle equipped with a high-power engine capable of generating a large torque in a low-speed range, or in a vehicle configured to enhance response of torque transmission to launch the vehicle quickly, the torque converter may be omitted. The vehicles without having the torque converter may be launched by the aforementioned friction start while causing the starting clutch arranged between the engine and the transmission to slip.

However, seizure of the starting clutch may be caused if an input torque to the starting clutch is excessively large, or if a speed difference between an input member and an output member of the starting clutch is excessively large. In order to prevent seizure of the starting clutch when launching the vehicle by the friction start, an output torque and a speed of the engine have to be limited. In the vehicle without having the torque converter, since the engine torque is not transmitted through the fluid, the acceleration of the vehicle may be increased sharply to a certain degree when launching the vehicle. However, as described, the output torque and the speed of the engine have to be limited to prevent occurrence of seizure of the starting clutch when launching the vehicle. That is, the acceleration will not be increased more than the limitations of the output torque and the speed of the engine when launching the vehicle. Specifically, even when launching the vehicle at full throttle, the output power of the engine will be restricted. That is, the vehicle is not allowed to launch and accelerate while fully utilizing the performance of the engine. On the other hand, in the vehicle having the torque converter, a speed difference between an output shaft of the engine and an input shaft of the transmission may be absorbed by the torque converter. Therefore, the vehicle having the torque converter may be launched rapidly by so-called a stall starting, specifically, by depressing an accelerator pedal while depressing a brake pedal to increase an engine speed and an engine torque, and then returning the brake pedal. However, the vehicle without having the torque converter cannot be launched rapidly by the aforementioned stall starting. In addition, since the output power of the engine will be restricted when launching the vehicle by the friction start, the vehicle may not be accelerated sufficiently even if the throttle is opened widely.

SUMMARY

Aspects of embodiments of the present disclosure have been conceived noting the foregoing technical problems, and it is therefore an object of the present disclosure is to provide a hybrid vehicle without having a torque converter that can be launched rapidly and accelerated sharply in a wide open throttle (WOT) condition.

The hybrid vehicle according to the embodiment of the present disclosure, comprises: an engine; a first motor that is arranged on an output side of the engine to be operated by at least part of an output torque of the engine to generate electricity; a drive wheel; a starting clutch that selectively allows and interrupts power transmission between the first motor and the drive wheel; an accelerator pedal that is operated by a driver; a brake pedal that is operated by the driver; and a controller that controls the engine, the first motor, and the starting clutch. In the hybrid vehicle, at least part of torques of the engine and the first motor is delivered to the drive wheel to generate a drive force by engaging the starting clutch, and the engine generates a torque in accordance with a depression of the accelerator pedal. The controller is configured to execute a torque absorbing control to reduce the torque of the engine to be delivered to the starting clutch by operating the first motor by the torque of the engine, when the starting clutch is disengaged and the depression of the accelerator pedal is greater than a threshold value.

In a non-limiting embodiment, the controller may be further configured to execute the torque absorbing control when the starting clutch is disengaged, the depression of the accelerator pedal is greater than the threshold value, and a depression of the brake pedal is greater than a threshold value.

In a non-limiting embodiment, the controller may be further configured to start engagement of the starting clutch to generate a drive force while reducing the torque of the engine to be delivered to the starting clutch, when the depression of the brake pedal is reduced smaller than the threshold value during execution of the torque absorbing control.

In a non-limiting embodiment, the controller may be further configured to execute the torque absorbing control such that the torque of the engine to operate the first motor becomes smaller than an upper limit value.

In a non-limiting embodiment, the controller may be further configured to terminate the torque absorbing control when the starting clutch is engaged completely.

In a non-limiting embodiment, the controller may be further configured to execute the torque absorbing control while starting engagement of the starting clutch to generate a drive force, when the starting clutch is disengaged, the depression of the accelerator pedal is greater than the threshold value, and a depression of the brake pedal is smaller than a threshold value.

In a non-limiting embodiment, the hybrid vehicle may further comprise a second motor that generates a torque to be delivered to the drive wheel to generate a drive force. The controller may be further configured to generate a torque by the second motor to generate a drive force while reducing the torque of the engine to be delivered to the starting clutch, when the depression of the brake pedal is reduced smaller than the threshold value during execution of the torque absorbing control.

In a non-limiting embodiment, the controller may be further configured to start engagement of the starting clutch after launching the hybrid vehicle by the drive force generated by the torque of the second motor.

In a non-limiting embodiment, the hybrid vehicle may further comprise a second motor that generates a torque to be delivered to the drive wheel to generate a drive force. The controller may be further configured to generate a torque by the second motor to generate a drive force while executing the torque absorbing control, when the starting clutch is disengaged, the depression of the accelerator pedal is greater than the threshold value, and the depression of the brake pedal is smaller than the threshold value.

According to the embodiment of the present disclosure, an engine torque and an engine speed may be raised by the torque absorbing control in preparation for the friction start of the hybrid vehicle. According to the embodiment of the present disclosure, therefore, the drive force can be increased promptly when launching the hybrid vehicle, and the hybrid vehicle can be accelerated sharply. In addition, the engine torque delivered to the starting clutch may be absorbed partially by the first motor, and hence a load applied to the starting clutch can be reduced to limit damage on the starting clutch.

The conventional vehicles having a torque converter can be launched quickly by the stall starting utilizing the torque converter. Specifically, the vehicle having a torque converter can be launched by the stall starting by depressing both of the accelerator pedal and the brake pedal to raise an engine speed in the stopping vehicle, and then returning the brake pedal. If a conventional vehicle without having a torque converter is launched by the stall starting, seizure of a clutch to be engaged to launch the vehicle by a friction start may occur. In order to avoid an occurrence of seizure of the stating clutch when launching the hybrid vehicle without having a torque converter by the friction start, according to the embodiment of the present disclosure, the hybrid vehicle may be launched by the stall starting in a simulated manner. Specifically, when launching the hybrid vehicle by the friction start, the engine torque to be delivered to the starting clutch may be absorbed partially by the first motor. According to the embodiment of the present disclosure, therefore, the hybrid vehicle can be launched by the stall starting in a simulated manner without causing seizure of the starting clutch.

That is, according to the embodiment of the present disclosure, the hybrid vehicle is allowed to be launched by the drive force increased in advance by depressing both of the accelerator pedal and the brake pedal. According to the embodiment of the present disclosure, therefore, the hybrid vehicle can be launched promptly and accelerated sharply by the stall starting in a simulated manner.

In addition, according to the embodiment of the present disclosure, the engine torque to be delivered to the starting clutch is limited smaller than the upper limit value. According to the embodiment of the present disclosure, therefore, the load applied to the starting clutch can be reduced to limit damage on the starting clutch when launching the hybrid vehicle by the stall starting in a simulated manner.

According to the embodiment of the present disclosure, the torque absorbing control is terminated when the starting clutch is engaged completely. According to the embodiment of the present disclosure, therefore, the hybrid vehicle can be launched by all of the output torque of the engine.

In other words, according to the embodiment of the present disclosure, the torque absorbing control is executed when launching the hybrid vehicle in the WOT condition. Specifically, the starting clutch is engaged when the output power of the engine has been raised to launch the hybrid vehicle. According to the embodiment of the present disclosure, therefore, the hybrid vehicle can be launched promptly and accelerated sharply.

According to the embodiment of the present disclosure, the engine torque to be delivered to the starting clutch is also limited smaller than the upper limit value when launching the hybrid vehicle in the WOT condition. According to the embodiment of the present disclosure, therefore, the load applied to the starting clutch may also be reduced to limit damage on the starting clutch when launching the hybrid vehicle in the WOT condition.

According to the embodiment of the present disclosure, the torque absorbing control is terminated when the starting clutch is engaged completely also in the case of launching the hybrid vehicle in the WOT condition. According to the embodiment of the present disclosure, therefore, the hybrid vehicle can be launched by all of the output torque of the engine in the WOT condition.

According to the embodiment of the present disclosure, the hybrid vehicle having the second motor for delivering the torque directly to the drive wheels may also be launched by the stall starting in a simulated manner. In this case, the hybrid vehicle is launched by the torque of the second motor while engaging the starting clutch gradually and increasing the engine torque. For this reason, the hybrid vehicle can be launched promptly and accelerated sharply.

In a case of launching the hybrid vehicle having the second motor by the stall starting in a simulated manner, specifically, engagement of the starting clutch is commenced after launching the hybrid vehicle by the torque of the second motor. In this case, a speed difference between an input member and an output member of the starting clutch is reduced with an increase in the vehicle speed. For this reason, the starting clutch may be engaged after reducing the speed difference between the input member and the output member, and hence the load applied to the starting clutch can be reduced to limit damage on the starting clutch.

In the case of launching the hybrid vehicle having the second motor by the stall starting in a simulated manner, the engine torque to be delivered to the starting clutch is limited smaller than the upper limit value after launching the hybrid vehicle by the torque of the second motor to protect the starting clutch. For this reason, the load applied to the starting clutch can be reduced to limit damage on the starting clutch. In addition, since the speed difference between the input member and the output member of the starting clutch has been reduced, the upper limit torque can be set to a greater value. For this reason, the output power of the engine can be increased when executing the torque absorbing control so that the hybrid vehicle is launched promptly and accelerated sharply.

In the case of launching the hybrid vehicle having the second motor by the stall starting in a simulated manner, the torque absorbing control is also terminated when the starting clutch is engaged completely after launching the hybrid vehicle by the torque of the second motor. In this case, the hybrid vehicle may also be launched by all of the output torque of the engine.

According to the embodiment of the present disclosure, the hybrid vehicle having the second motor may also be launched in the WOT condition while executing the torque absorbing control. In this case, the hybrid vehicle is also launched by the torque of the second motor while engaging the starting clutch gradually and increasing the engine torque. For this reason, the hybrid vehicle can be launched promptly and accelerated sharply.

In the case of launching the hybrid vehicle having the second motor in the WOT condition, engagement of the starting clutch is also commenced after launching the hybrid vehicle by the torque of the second motor. That is, the speed difference between the input member and the output member of the starting clutch is also reduced with an increase in the vehicle speed. For this reason, the starting clutch may also be engaged after reducing the speed difference between the input member and the output member, and hence the load applied to the starting clutch can be reduced to limit damage on the starting clutch.

In the case of launching the hybrid vehicle having the second motor in the WOT condition, the engine torque to be delivered to the starting clutch is also limited smaller than the upper limit value after launching the hybrid vehicle by the torque of the second motor to protect the starting clutch. For this reason, the load applied to the starting clutch may also be reduced to limit damage on the starting clutch. In addition, since the speed difference between the input member and the output member of the starting clutch has been reduced, the upper limit torque may also be set to a greater value. For this reason, the output power of the engine can be increased when executing the torque absorbing control so that the hybrid vehicle is launched promptly and accelerated sharply.

In the case of launching the hybrid vehicle having the second motor in the WOT condition, the torque absorbing control is also terminated when the starting clutch is engaged completely after launching the hybrid vehicle by the torque of the second motor. In this case, the hybrid vehicle may also be launched by all of the output torque of the engine.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Preferred embodiments of the present disclosure will now be explained with reference to the accompanying drawings.

The present disclosure is applied to a hybrid vehicle having an engine and at least one motor. In the hybrid vehicle, the motor is disposed on an output side of the engine to deliver torque to drive wheels via a transmission. The hybrid vehicle is provided with a starting clutch that can be engaged while causing slip instead of a torque converter. The starting clutch is arranged between the motor and the transmission to selectively allow and interrupt torque transmission between a prime mover and the drive wheels. Instead, a clutch mechanism installed in the transmission may also be used as the starting clutch.

Figure 1:
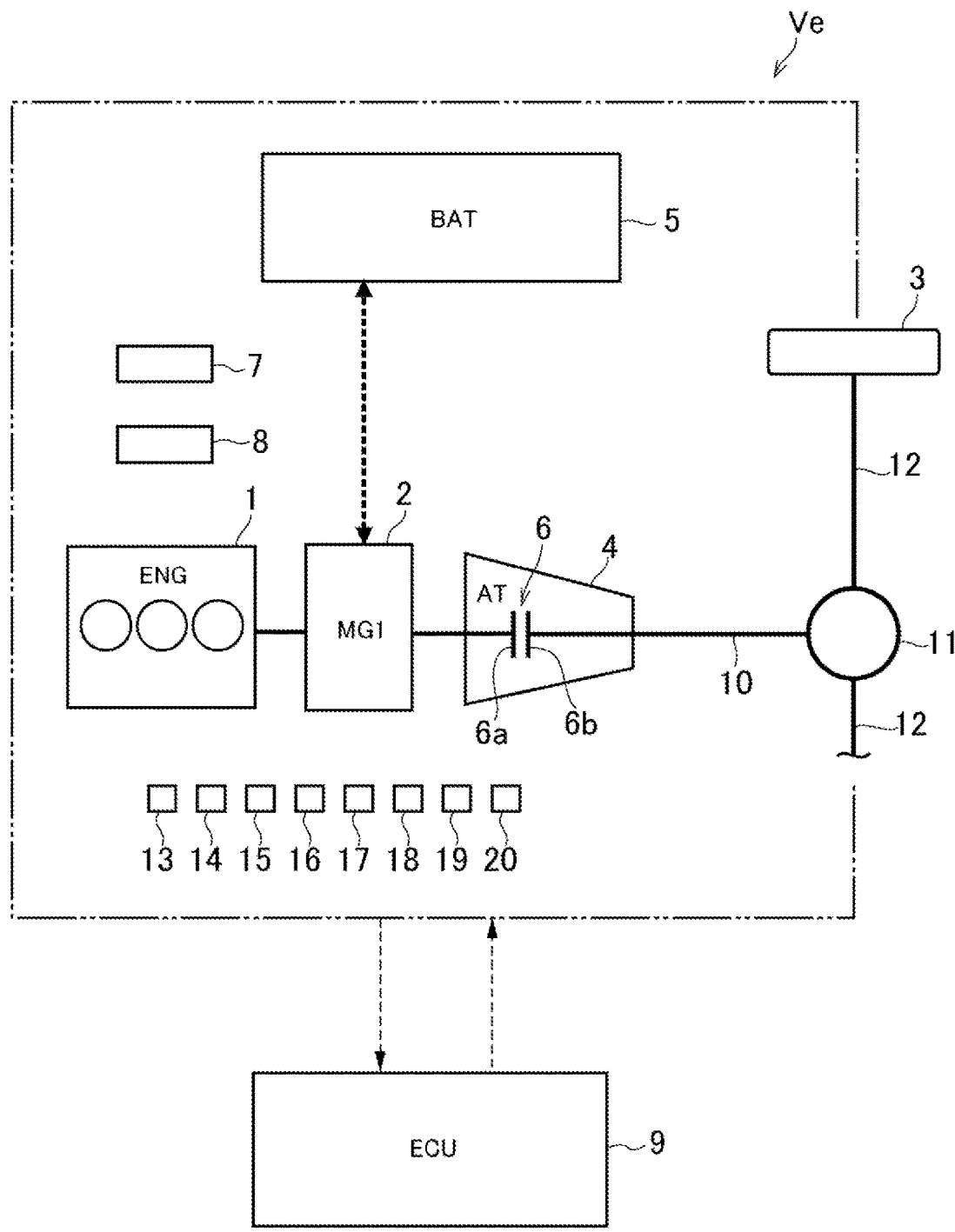
FIG. 1 is a schematic illustration showing an example of a drive system and a control system of the hybrid vehicle according to the present disclosure.

Referring now to FIG. 1, there is schematically shown an example of a drive system and a control system of a hybrid vehicle (as will be simply called the "vehicle" hereinafter) Ve. A prime mover of the vehicle Ve includes an engine (referred to as "ENG" in FIG. 1) 1 and a first motor (referred to as "MG1" in FIG. 1) 2. The vehicle Ve further comprises drive wheels 3, a transmission (referred to as "AT" in FIG. 1) 4, a battery (referred to as "BAT" in FIG. 1) 5, a clutch 6, an accelerator pedal 7, a brake pedal 8, and a controller (referred to as "ECU" in FIG. 1) 9.

For example, an internal combustion engine such as a gasoline engine and a diesel engine may be adopted as the engine 1. An output power of the engine 1 may be adjusted electrically, and the engine 1 may be started and stopped electrically according to need. For example, given that the gasoline engine is used as the engine 1, an opening degree of a throttle valve, an amount of fuel supply, a commencement and a termination of ignition, an ignition timing etc. may be controlled electrically. By contrast, given that the diesel engine is used as the engine 1, an amount of fuel injection, an ignition timing, an opening degree of a throttle valve of an EGR system etc. may be controlled electrically.

The first motor 2 as a motor-generator is disposed on the output side of the engine 1, and driven by part of an output torque of the engine 1 to generate electricity. For example, a permanent magnet type synchronous motor, and an induction motor may be adopted as the first motor 2.

The prime mover is connected to the drive wheels 3 through the transmission 4, a propeller shaft 10, a differential gear unit 11, and driveshafts 12 so that the output torque(s) of the prime mover is delivered to the drive wheels 3. Thus, the vehicle Ve shown in FIG. 1 is a rear-drive vehicle in which a drive torque generated by the prime mover is delivered to a pair of rear wheels as drive wheels 3. Nonetheless, the present disclosure may also be applied to a front-drive vehicle in which the drive torque is delivered to a pair of front wheels, and a four-wheel-drive vehicle in which the drive torque is distributed to each pair of front wheels and rear wheels.

The transmission 4 as an automatic transmission is disposed on an output side of the first motor 2 to transmit torque between the prime mover (i.e., the engine 1 and the first motor 2) and the drive wheels 3. The transmission 4 is adapted to change a ratio of an input speed to an output speed arbitrarily. For example, a geared transmission and a continuously variable transmission may be used as the transmission 4. Preferably, the transmission 4 is provided with a clutch that is engaged to transmit torque, and that is disengaged to interrupt torque transmission thereby establishing a neutral state.

The battery 5 as an electric storage device is electrically connected with the first motor 2 so that the battery 5 is charged with the electricity generated by the first motor 2. The electricity accumulated in the battery 5 may be supplied to the first motor 2 to operate the first motor 2. According to the embodiment, a capacitor or a condenser may also be used instead of the battery 5.

In order to selectively allows and interrupts torque transmission between the engine 1 and the first motor 2, and the drive wheels 3, the clutch 6 as a starting clutch is installed in the transmission 4. In the example shown in FIG. 1, for example, a friction clutch which can be engaged partially while causing slip is adopted as the clutch 6. Specifically, the clutch 6 comprises a friction plate 6a coupled to a rotary member (not shown) of the prime mover side, and a friction plate 6b coupled to a rotary member (not shown) of the drive wheels 3 side. Although not illustrated in detail, a multiple-plate friction clutch in which a plurality of the friction plates 6a and a plurality of friction plates 6b are arranged alternately may also be used as the clutch 6. According to the embodiment, the clutch 6 may also be arranged between the first motor 2 and the transmission 4. The vehicle Ve may be launched by engaging the clutch 6 while causing slip thereby transmitting a drive torque generated by the prime mover to the drive wheels 3. Thus, the vehicle Ve can be launched by the friction start using the clutch 6.

An output power of the prime mover is changed depending on a depression of the accelerator pedal 7, in other words, a position of the accelerator pedal 7. A position of the accelerator pedal 7 is detected by an accelerator sensor (or an accelerator switch) 13, and the position of the accelerator pedal 7 detected by the accelerator sensor 13 is transmitted in the form of electric signal. A position of the accelerator pedal 7 may also be detected based on a detection value of a stroke sensor (not shown) that detects a stroke of the accelerator pedal 7, a detection value of a pedal force sensor (not shown) that detects a pedal force applied to the accelerator pedal 7, or a detection value of a throttle sensor (not shown) that detects an opening degree of the throttle valve that is changed in accordance with a position of the accelerator pedal 7.

A brake torque generated by a brake device (not shown) is changed depending on a depression of the brake pedal 8, in other words, a position of the brake pedal 8. A position of the brake pedal 8 is detected by a brake sensor (or a brake switch) 14, and the position of the brake pedal 8 detected by the brake sensor 14 is transmitted in the form of electric signal. A position of the brake pedal 8 may also be detected based on a detection value of a stroke sensor (not shown) that detects a stroke of the brake pedal 8, a detection value of a pedal force sensor (not shown) that detects a pedal force applied to the brake pedal 8, or a detection value of a hydraulic sensor (not shown) that detects a hydraulic pressure applied to a master cylinder of the brake device.

The controller 9 is an electronic control unit configured to control the engine 1, the first motor 2, the transmission 4, the clutch 6 and so on. For example, the controller 9 receives data from the accelerator sensor 13, the brake sensor 14, a vehicle speed sensor 15 that detects a speed of the vehicle Ve, an engine speed sensor 16 that detects a speed of the engine 1, a motor speed sensor (or a resolver) 17 that detects a speed of the first motor 2, an input speed sensor 18 that detects an input speed to the clutch 6 (i.e., a speed of the friction plate 6a or an input speed to the transmission 4), an output speed sensor 19 that detects an output speed from the clutch 6 (i.e., a speed of the friction plate 6b or an output speed to the transmission 4), a battery sensor 20 that detects a state of charge level of the battery 5, and so on. The controller 9 executes a calculation based on the above-mentioned incident data as well as data and formulas stored in advance, and transmits a calculation result in the form of command signal to the prime mover and so on.

As described, the vehicle Ve is not provided with the torque converter, and launched by the friction start using the clutch 6. In the conventional vehicles without having the torque converter, seizure of the starting clutch may occur when launching the vehicle by the friction start. For this reason, the conventional vehicles without having the torque converter may not be lunched by the stall starting. On the other hand, the controller 9 of the vehicle Ve according to the embodiment is configured to execute the stall stating in a simulated manner utilizing the first motor 2, thereby accelerating the vehicle Ve sharply when launching in a wide open throttle (to be abbreviated as "WOT" hereinafter) condition. An example of a routine to launch the vehicle Ve by the after-mentioned "quasi-stall stating" or "WOT starting" is shown in FIG. 2.

Figure 2:
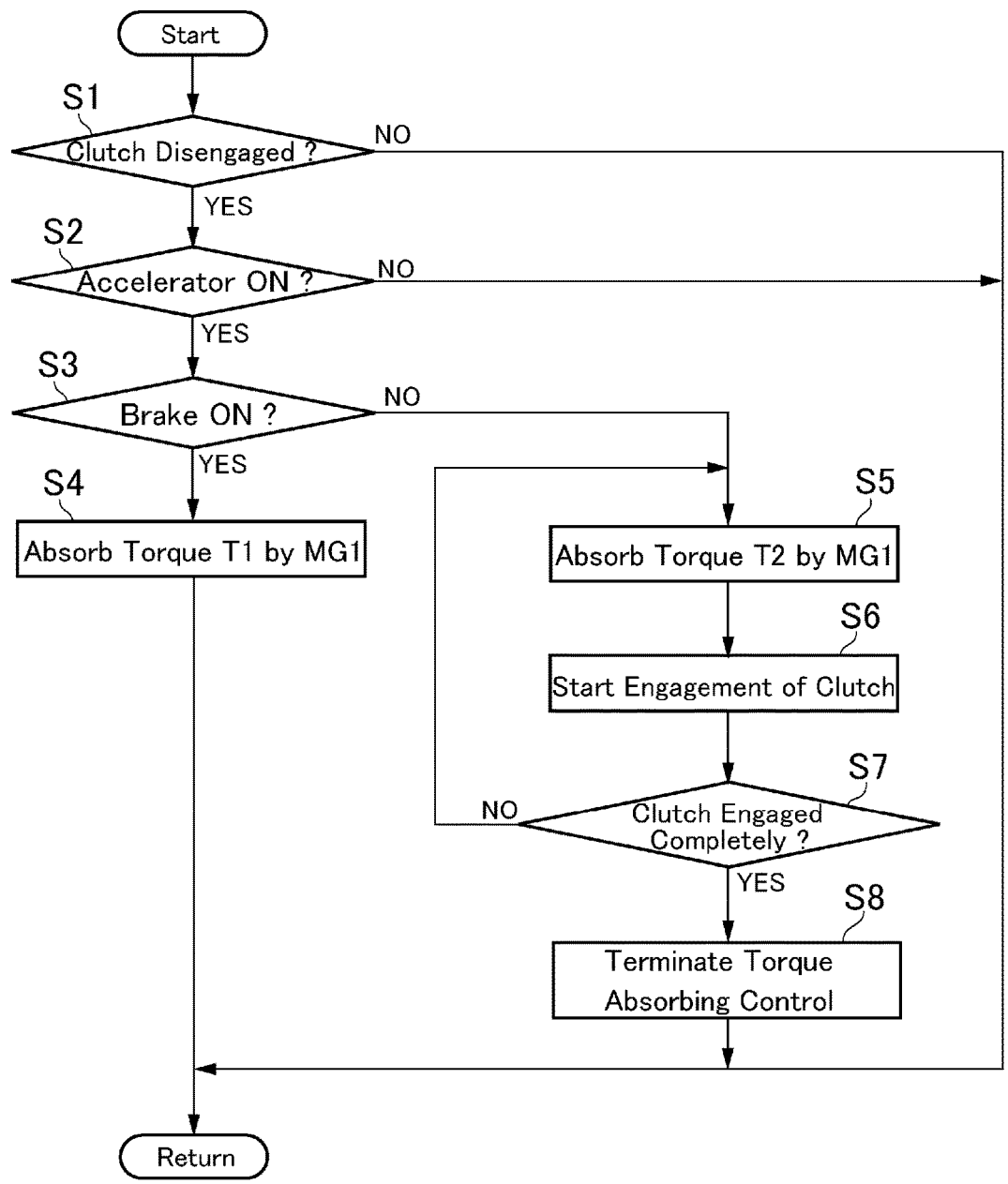
FIG. 2 is a flowchart showing an example of a routine executed by the controller of the hybrid vehicle.

The routine shown in FIG. 2 is carried out when the battery 5 is not fully charged. Accordingly, the routine shown in FIG. 2 will not be carried out when the battery 5 is fully charged, or when the state of charge level of the battery 5 is higher than a predetermined level.

At step S1, it is determined whether the clutch 6 is in disengagement. According to the embodiment, the controller 9 determines that the clutch 6 is "disengaged" when the clutch 6 is not engaged completely. That is, the controller 9 determines that the clutch 6 is "disengaged" even if the clutch is partially engaged while causing slip between the friction plate 6a and the friction plate 6b. Therefore, if the clutch 6 is engaged completely, the answer of step S1 will be NO. By contrast, if the clutch 6 is engaged while causing slip between the friction plate 6a and the friction plate 6b, the answer of step S1 will be YES.

If the clutch 6 is not disengaged so that the answer of step S1 is NO, the routine returns without carrying out any specific control.

Otherwise, if the clutch 6 is disengaged so that the answer of step S1 is YES, the routine progresses to step S2 to determine whether the accelerator pedal 7 is depressed by a driver. Specifically, the answer of step S2 will be YES when the depression APA of the accelerator pedal 7 detected by the accelerator sensor 13 is greater than a threshold value APAth of the depression APA of the accelerator pedal 7. To this end, the threshold value APAth is set to a lower limit value of the depression APA of the accelerator pedal 7 at which the vehicle Ve can be launched by the quasi-stall stating, based on a result of a simulation or an experiment. Specifically, the threshold value APAth is set to a lower limit value of the depression APA of the accelerator pedal 7 at which the WOT condition is substantially established.

If the depression APA of the accelerator pedal 7 is smaller than the threshold value APAth so that the answer of step S2 is NO, the routine returns without carrying out any specific control.

By contrast, if the depression APA of the accelerator pedal 7 is greater than the threshold value APAth so that the answer of step S2 is YES, the routine progresses to step S3 to determine whether the brake pedal 8 is depressed by the driver. Specifically, the answer of step S3 will be YES when the depression BPA of the brake pedal 8 detected by the brake sensor 14 is greater than a threshold value BPAth of the depression BPA of the brake pedal 8. By contrast, the answer of step S3 will be NO when the depression BPA of the brake pedal 8 is smaller than the threshold value BPAth. To this end, the threshold value BPAth is set to a lower limit value of the depression BPA of the brake pedal 8 at which the vehicle Ve can be launched by the quasi-stall stating, based on a result of a simulation or an experiment. Specifically, the threshold value BPAth is set to a lower limit value of the depression BPA of the brake pedal 8 at which the brake device can establish a brake force which is greater than a drive force generated in the WOT condition to keep stopping the vehicle Ve.

If the depression BPA of the brake pedal 8 is greater than the threshold value BPAth so that the answer of step S3 is YES, the routine progresses to step S4.

At step S4, a torque absorbing control is executed to partially absorb an output torque Te of the engine 1 by the first motor 2. Specifically, the first motor 2 is operated as a generator by a torque T1 as at least part of the output torque Te of the engine 1 governed by the depression APA of the accelerator pedal 7. That is, the torque T1 of the engine 1 is used to generate electricity by the first motor 2.

Thus, the first motor 2 is operated as a generator by the torque T1 as a part of the output torque Te of the engine 1, and the electricity generated by the first motor 2 is accumulated in the battery 5. The torque T1 to generate electricity by the first motor 2 is increased in accordance with an increase in an amount of production of electricity by the first motor 2. As a result, the remaining output torque Te of the engine 1 delivered to the clutch 6 to launch the vehicle Ve is reduced with an increase in the torque T1 to generate electricity by the first motor 2. Thus, at step S4, the output torque Te of the engine 1 to be delivered to the clutch 6 to launch the vehicle Ve is reduced by operating the first motor 2 as a generator by the torque T1 as a part of the output torque Te of the engine 1.

The electricity generated by the first motor 2 may also be supplied to other electrical equipment or devices of the vehicle Ve without passing through the battery 5.

At step S4, the torque T1 of the engine 1 to operate the first motor 2 as a generator and the output torque Te of the engine 1 can be increased and decreased by controlling a power generation amount of the first motor 2. For example, the torque T1 of the engine 1 to be absorbed by the first motor 2 is increased by increasing a power generation amount of the first motor 2. Consequently, the output torque Te of the engine 1 is increased in the amount of increase in the torque T1. That is, a ratio of the torque T1 to the output torque Te can be changed by controlling a power generation amount of the first motor 2 thereby changing the drive torque to be delivered to the clutch 6. For example, the output torque Te can be increased without delivering the output torque Te to the clutch 6 by controlling the power generation amount of the first motor 2 in such a manner that the output torque Te of the engine 1 is absorbed 100% by the first motor 2. In addition, the drive torque to be delivered to the clutch 6 can be gradually increased by gradually reducing the power generation amount of the first motor 2, in other words, by gradually reducing the torque T1 to operate the first motor 2 as a generator.

Thus, at step S4, the output power of the engine 1 can be increased while reducing the engine torque Te to be delivered to the clutch 6, or without delivering the engine torque Te to the clutch 6. As described later, the output power of the engine 1 can be increased immediately before launching the vehicle Ve, or while causing the clutch 6 to slip. For this reason, the vehicle Ve without having the torque converter can be launched by the "quasi-stall stating".

In addition to the above-explained torque absorbing control, at step S4, the output power of the engine 1 is increased in preparation for the "quasi-stall stating", and thereafter returns.

By contrast, if the depression BPA of the brake pedal 8 is smaller than the threshold value BPAth so that the answer of step S3 is NO, the routine progresses to step S5.

At step S5, the torque absorbing control is also executed to partially absorb an output torque Te of the engine 1 by the first motor 2. The torque absorbing control executed at step S5 is substantially similar to the torque absorbing control executed at step S4. At step S5, the first motor 2 is operated as a generator by a torque T2 as at least part of the output torque Te of the engine 1. The torque T2 may be set not only by the same procedure as the torque T1 but also by a different procedure from the torque T1. As described, in order to launch the vehicle Ve without having a torque converter by the "quasi-stall stating", the torque T1 is set in such a manner as to increase the output power of the engine 1 as much as possible while depressing both of the accelerator pedal 7 and the brake pedal 8 before engaging the clutch 6 while causing slip. On the other hand, the torque T2 is set in such a manner as to increase the output power of the engine 1 while protecting the clutch 6 when launching the vehicle Ve by the "quasi-stall stating" or by an after mentioned "WOT starting". Specifically, the torque T2 is set in such a manner that the torque of the engine 1 to be delivered to the clutch 6 to launch the vehicle Ve, that is, a difference between the output torque Te of the engine 1 and the torque T2 to operate the first motor 2 as a generator becomes smaller than an upper limit value Tmax.

Thus, the upper limit value Tmax is an upper limit value of the torque to be delivered to the clutch 6 for protecting the clutch 6. To this end, the upper limit value Tmax is set to a maximum value of the torque possible to launch the vehicle Ve by the "quasi-stall stating" or by the "WOT starting" without causing seizure of the clutch 6. Specifically, the upper limit value Tmax is set in such a manner that a heat generated when engaging the clutch 6 while causing slip will not exceed a maximum allowable heat Jal of the clutch 6 that is governed by a structure of the clutch 6. The maximum allowable heat Jal of the clutch 6 may be found based on a result of experiment or simulation.

Figure 3:
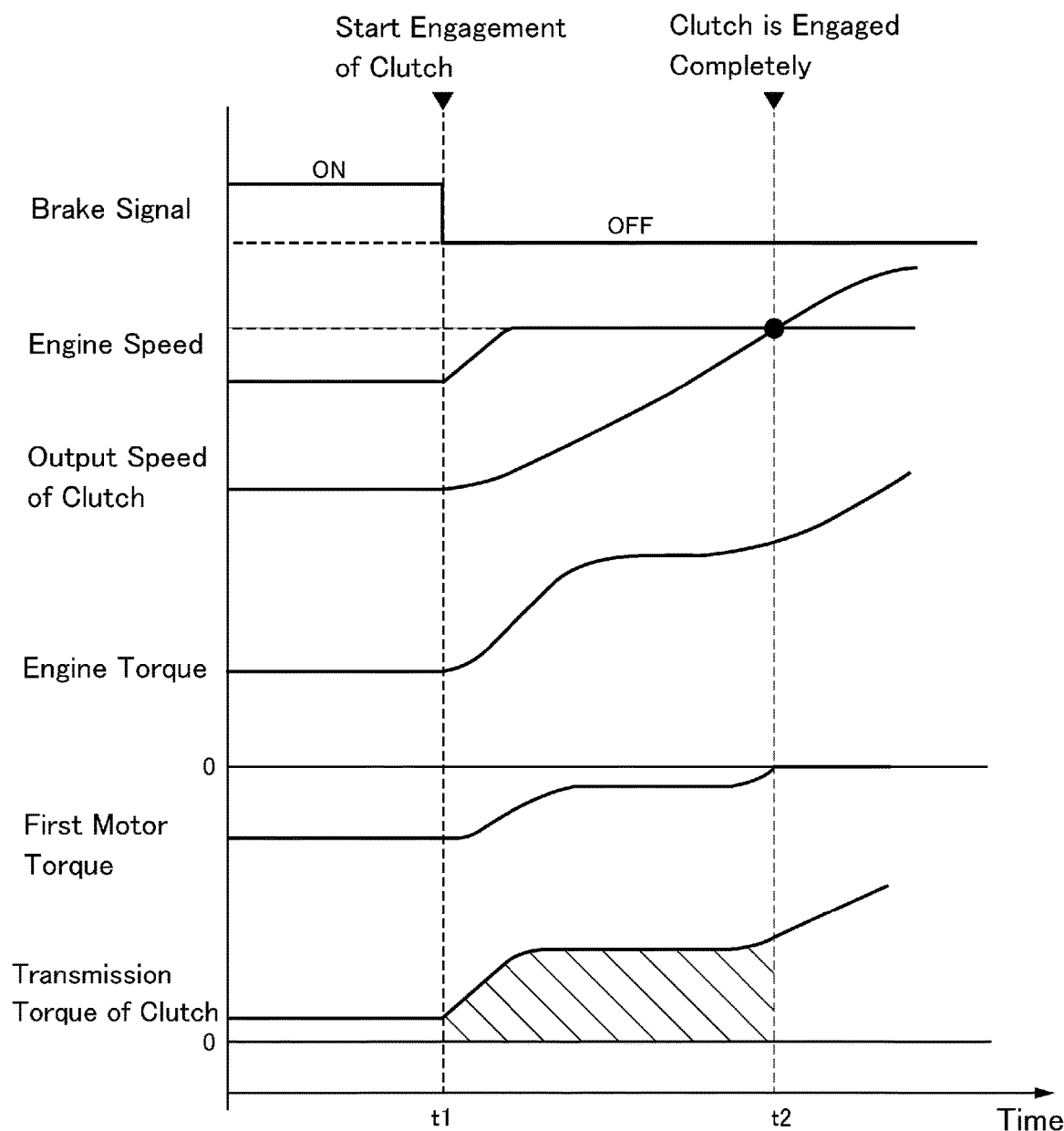
FIG. 3 is a time chart indicating an upper limit torque in the routine shown in FIG. 2.

For example, as indicated by FIG. 3, an amount of heat generated by engaging the clutch 6 while causing slip may be calculated by integrating: a product of a transmission torque Tc of the clutch 6 (i.e., the drive torque) and a speed Ne of the engine 1 (i.e., an input speed to the clutch 6); by a period of time from a point t1 at which an engagement of the clutch 6 is started to a point t2 at which the clutch 6 is engaged completely. In order to suppress the heat of the clutch 6 lower than the maximum allowable heat Jal of the clutch 6 when launching the vehicle Ve by the "quasi-stall stating" or by the "WOT starting", specifically, the output torque Te of the engine 1 to be delivered to the clutch 6 is suppressed lower than the upper limit value Tmax by controlling the output torque Te, the torque T2, and the power generation amount of the first motor 2.

Given that a wet-type friction clutch that is cooled by oil is used as the clutch 6, a drag torque is generated by a viscous resistance of the oil before point t1, that is, before starting the engagement of the clutch 6. If a temperature of the clutch 6 is raised excessively by the drag torque, the oil may be deteriorated by the heat of the clutch 6. In order to prevent such deterioration of the oil, an upper limit value Tmax' of the torque of the engine 1 to be delivered to the clutch 6 may be set taking account of the drag torque. In this case, the upper limit value Tmax' is set in such a manner that a workload generated by the drag torque will not exceed a maximum workload that can be cooled by a cooling capacity of the oil. Specifically, the workload generated by the drag torque can be calculated by multiplying a transmission torque Tc' of the clutch 6 (that is, the drag torque) by a speed Ne' of the engine 1 (i.e., an input speed to the clutch 6). Thus, when absorbing the output torque Te of the engine 1 by the first motor 2, the output power of the engine 1 may also be controlled in such a manner as to reduce the drag torque smaller than the upper limit value Tmax'.

As described, at step S5, the torque absorbing control is executed to reduce the output torque Te of the engine 1 to be delivered to the clutch 6 smaller than the upper limit value Tmax by controlling the output torque Te, the torque T2, and the power generation amount of the first motor 2.

After step S5 or simultaneously with step S5, the clutch 6 is started to be engaged gradually at step S6. Consequently, the vehicle Ve is launched by the friction start.

In a case that the torque absorbing control has already been executed at step S4 but the brake pedal 8 is returned during execution of the torque absorbing control, the routine progresses to steps S5 and S6 to launch the vehicle by the "quasi-stall stating".

Thus, in the case that the routine progresses to steps S5 and S6 before executing the torque absorbing control at step S4, the torque T2 of the engine 1 is absorbed by the first motor 2 while engaging the clutch 6. In this case, since both of the accelerator pedal 7 and the brake pedal 8 are not depressed, the vehicle is not launched by the "quasi-stall stating" but launched by the friction start. In this situation, specifically, the brake pedal 8 is returned, and the depression APA of the accelerator pedal 7 is greater than the threshold value APAth. Consequently, the vehicle Ve is launched by the WOT starting to start the vehicle Ve in the WOT condition, while absorbing the output torque Te of the engine 1 to be delivered to the clutch 6 by the first motor 2.

That is, in any of the cases that the vehicle Ve is launched by the "quasi-stall stating" and that the vehicle Ve is launched by the "WOT starting", the torque absorbing control is executed at steps S5 and S6. Therefore, the output power of the engine 1 can be raised promptly when launching the vehicle Ve while reducing a load applied to the clutch 6 that is engaged while causing slip. For this reason, the drive force and the acceleration of the vehicle Ve can be increased sharply to launch the vehicle Ve promptly. In addition, a damage of the clutch 6 can be limited.

Then, it is determined at step S7 whether the clutch 6 is engaged completely. As described, the engagement of the clutch 6 is started at step S6, and a torque transmitting capacity of the clutch 6 is increased gradually until the clutch 6 is engaged completely. At step S7, specifically, such determination of the complete engagement of the clutch 6 is made when a speed difference between the friction plates 6a and 6b of the clutch 6 is reduced to zero.

If the clutch 6 has not yet been engaged completely so that the answer of step S7 is NO, the routine returns to step S5 to repeat the torque absorbing control at step S5 and to continue engagement of the clutch 6 at step S6. By contrast, if the clutch 6 has been engaged completely so that the answer of step S7 is YES, the routine progresses to step S8 to terminate the torque absorbing control.

As a result of engaging the clutch 6 completely and terminating the torque absorbing control, the engine 1 is allowed to generate the maximum output power to accelerate the vehicle Ve sharply. In this situation, the first motor 2 may be operated as a motor, and an output torque of the first motor 2 may also be delivered to the drive wheels 3 together with the output torque Te of the engine 1. Consequently, the drive force can be increased to accelerate the vehicle Ve more promptly. Thereafter, the routine returns.

Figure 4A:
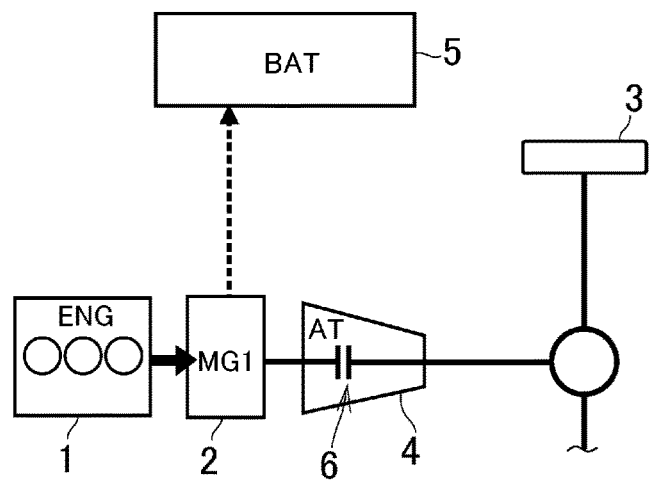
FIGS. 4A, 4B and 4C are schematic illustrations indicating flows of torque and electricity during execution of the routine shown in FIG. 2.
Figure 4B:
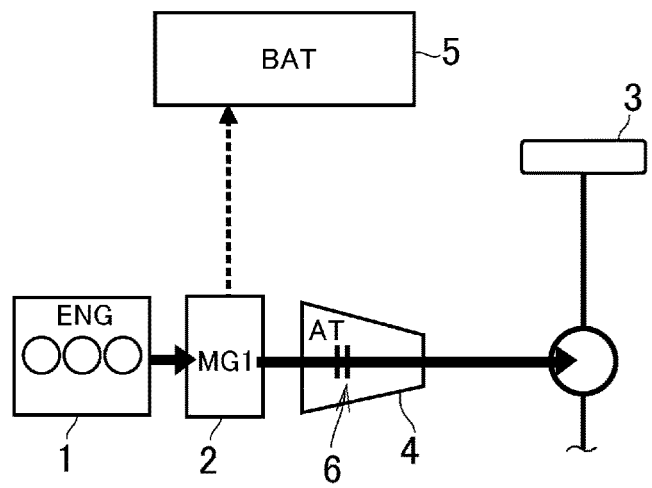
Figure 4C:
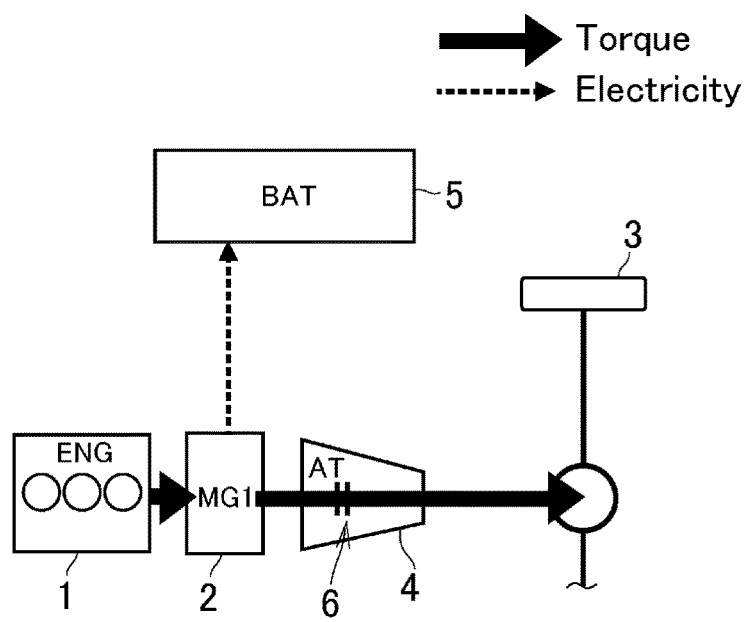

FIGS. 4A, 4B and 4C show a flow of the torque between the prime mover and the drive wheels 3 and a flow of the electricity between the first motor 2 and the battery 5 when launching the vehicle Ve while executing the torque absorbing control. FIG. 4A shows a situation before launching the vehicle Ve, and in the situation shown in FIG. 4A, the clutch 6 is still disengaged. Specifically, in the case of launching the vehicle Ve by the "quasi-stall stating", both of the accelerator pedal 7 and the brake pedal 8 are depressed in the situation shown in FIG. 4A. By contrast, in the case of launching the vehicle Ve by the "WOT starting", the accelerator pedal 7 has just been depressed immediately before starting the engagement of the clutch 6 in the situation shown in FIG. 4A.

During execution of the torque absorbing control, as shown in FIG. 4A, the accelerator pedal 7 is depressed before launching the vehicle Ve so that the output torque Te of the engine 1 is delivered to the first motor 2. Consequently, the first motor 2 is operated as a generator by the output torque Te of the engine 1, and the electricity generated by the first motor 2 is accumulated in the battery 5. In this situation, the output torque Te of the engine 1 is delivered to the first motor 2 substantially entirely to operate the first motor 2 as a generator. Given that the wet-type friction clutch is used as the clutch 6, the output torque Te of the engine 1 is slightly delivered to the clutch 6 in the form of drag torque as explained with reference to FIG. 3. Nonetheless, FIG. 4A shows a situation in which the output torque Te of the engine 1 is delivered entirely to the first motor 2.

As described, the kinetic energy generated by the engine 1 in the form of the output torque Te is translated into the electric energy by operating the first motor 2 as a generator by the output torque Te of the engine 1. In other words, the output torque Te of the engine 1 is absorbed by the first motor 2. In this situation, therefore, the output torque Te of the engine 1 can be increased in the amount of the torque T1 or T2 absorbed by the absorbed by the first motor 2. That is, the output torque Te of the engine 1 can be increased by absorbing the output torque Te by the first motor 2 before launching the vehicle Ve without delivering the output torque Te of the engine 1 to the clutch 6. In other words, the output power of the engine 1 can be increased before launching the vehicle Ve.

FIG. 4B shows a situation immediately after launching the vehicle Ve, and in the situation shown in FIG. 4B the clutch 6 has not yet been engaged completely, that is, the clutch 6 still engaged partially while causing slip. Specifically, in the case of launching the vehicle Ve by the "quasi-stall stating", the brake pedal 8 is released while depressing the accelerator pedal 7 in the situation shown in FIG. 4B. By contrast, in the case of launching the vehicle Ve by the "WOT starting", the accelerator pedal 7 has just been depressed in the situation shown in FIG. 4B.

In the routine shown in FIG. 2, the engagement of the clutch 6 is started when the brake pedal 8 is released to launch the vehicle Ve by the "quasi-stall stating", or immediately after the accelerator pedal 7 is depressed to launch the vehicle Ve by the "WOT starting". Consequently, as shown in FIG. 4B, the first motor 2 is operated as a generator continuously by the torque T1 or T2 as a part of the output torque Te of the engine 1. In other words, the output torque Te of the engine 1 is partially absorbed by the first motor 2. The remaining part of the output torque Te of the engine 1 is delivered to the clutch 6 by engaging the clutch 6 while causing slip so that the drive force is generated gradually. As described, in order to protect the clutch 6, the torque to be delivered to the clutch 6 is suppressed smaller than the upper limit value Tmax. For this reason, the vehicle Ve can be launched by the part of the output torque Te of the engine 1 that is increased in advance, while protecting the clutch 6. That is, the vehicle Ve without having a torque converter can be launched by the "quasi-stall stating" or the "WOT starting".

FIG. 4C shows a situation in which the clutch 6 is engaged completely after launching the vehicle Ve. As described, the engagement of the clutch 6 is completed when the speed difference between the friction plates 6a and 6b of the clutch 6 becomes zero.

When the clutch 6 is engaged completely, the output torque Te of the engine 1 is delivered entirely to the clutch 6 so that the vehicle Ve can be launched and accelerated by all of the output power of the engine 1. In this situation, the first motor 2 may be operated as a motor by supplying electricity from the battery 5, and as indicated in FIG. 4C, an output torque of the first motor 2 may be delivered to the clutch 6 together with the output torque Te of the engine 1. Consequently, the drive force to launch the vehicle Ve can be increased, and the vehicle Ve can be accelerated more promptly.

Figure 5:
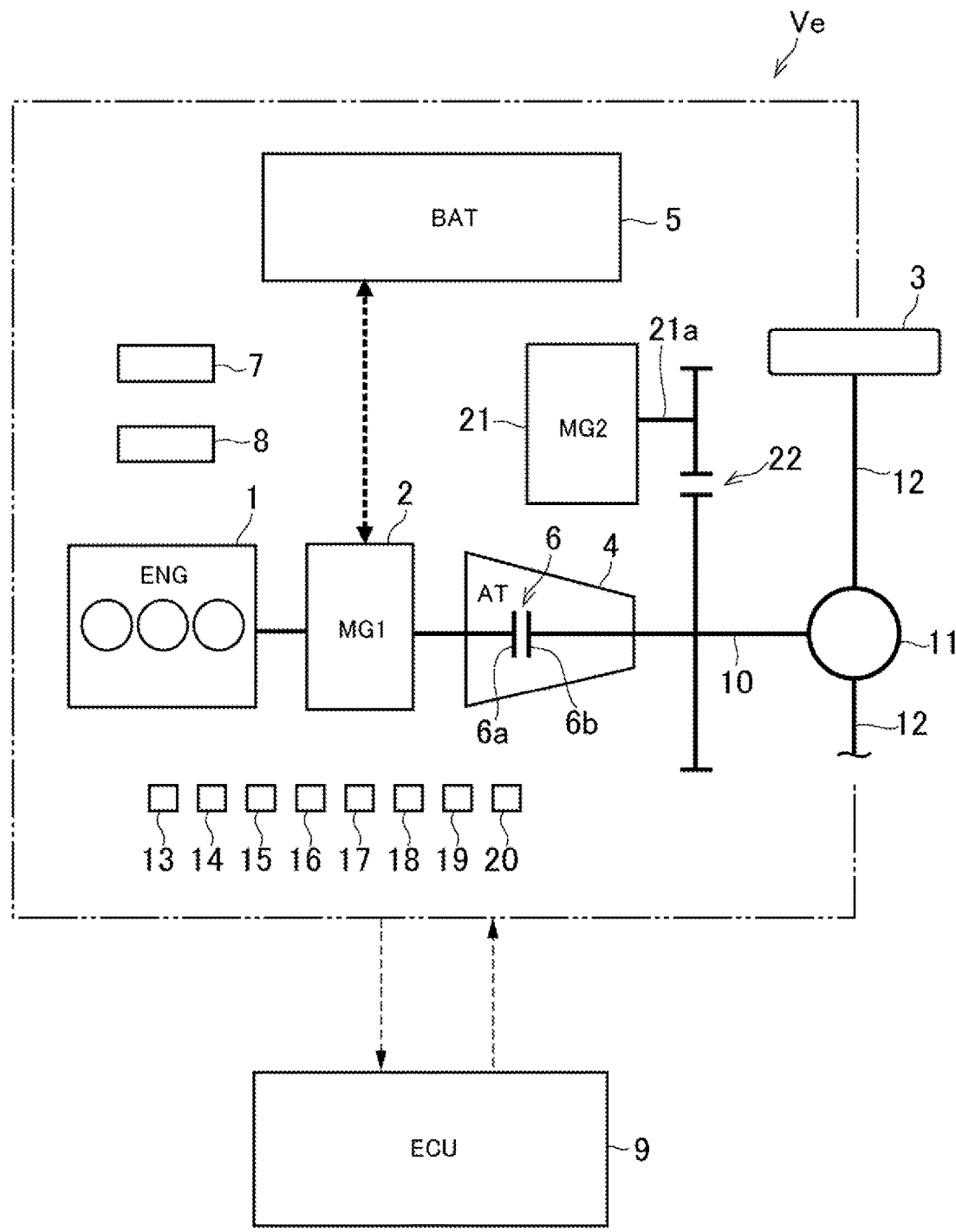
FIG. 5 is a schematic illustration showing another example of the drive system and the control system of the hybrid vehicle according to the present disclosure.

Turning now to FIG. 5, there is schematically shown another example of the vehicle Ve. In the example shown in FIG. 5, the prime mover of the vehicle Ve further includes a second motor (referred to as "MG2" in FIG. 5) 21 in addition to the engine 1 and the first motor 2. The remaining structures of the vehicle Ve shown in FIG. 5 are similar to those of the vehicle Ve shown in FIG. 1, and in FIG. 5, common reference numerals are allotted to the elements in common with those in the vehicle Ve shown in FIG. 1.

For example, a permanent magnet type synchronous motor and an induction motor may also be adopted as the second motor 21 to serve as a prime mover. The second motor 21 is connected to the battery 5 so that the second motor 21 is operated by the electricity supplied from the battery 5 to generate a torque. The second motor 21 is also connected to the first motor 2, and hence the second motor 21 may also be operated by directly supplying the electricity generated by the first motor 2 to the second motor 21.

Specifically, the second motor 21 is disposed on the output side of the transmission 4, and an output shaft 21a of the second motor 21 is connected to the propeller shaft 10 or the output shaft of the transmission 4 (not shown) through a reduction gear 22. Therefore, an output torque of the second motor 21 is delivered to the drive wheels 3 while being multiplied by the reduction gear 22 and the differential gear unit 11. In the vehicle Ve shown in FIG. 5, the output torque Te of the engine 1 and the output torque of the first motor 2 are delivered to the drive wheels 3 at least partially by engaging the clutch 6. In addition, the output torque of the second motor 21 may also be delivered to the drive wheels 3. Instead, the vehicle Ve shown in FIG. 5 may also be propelled only by the output torque of the second motor 21.

The second motor 21 is also connected electrically with the controller 9 to be controlled by the controller 9 integrally with the engine 1, the first motor 2, and the clutch 6.

Figure 6:
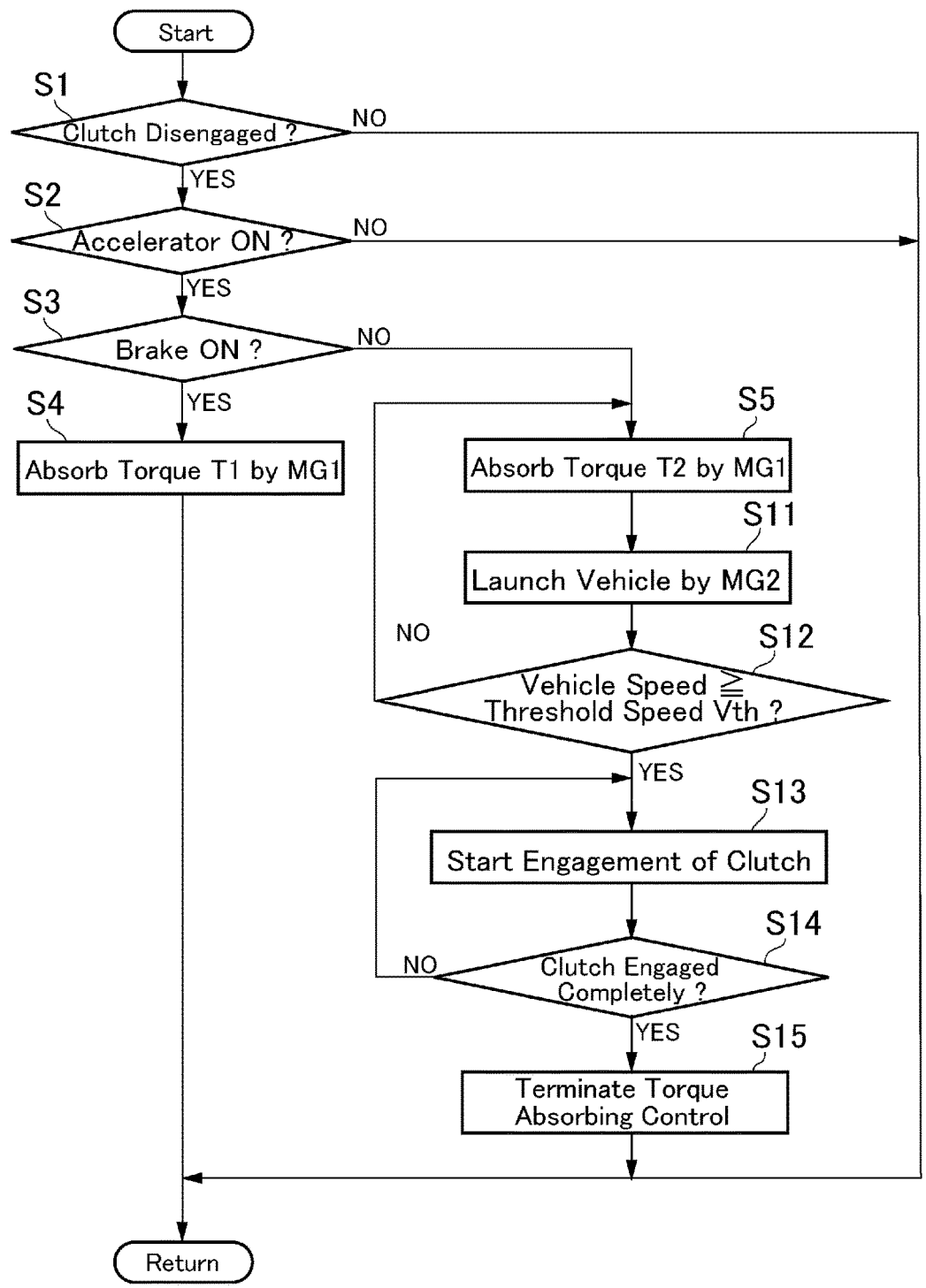
FIG. 6 is a flowchart showing another example of the routine executed by the controller of the hybrid vehicle.

The vehicle Ve shown in FIG. 5 may be launched by the "quasi-stall stating" or the "WOT starting" shown in FIG. 2. Alternatively, the vehicle Ve shown in FIG. 5 may also be launched by the routine shown in FIG. 6. In FIG. 6, common step numbers are allotted to the steps in common with those in the routine shown in FIG. 2.

In the routine shown in FIG. 6, steps S1 to S4 are identical to those in the routine shown in FIG. 2. Specifically, in the case that both of the accelerator pedal 7 and the brake pedal 8 are depressed, the torque T1 of the output torque Te of the engine 1 is absorbed by the first motor 2 in preparation for the "quasi-stall stating".

In the routine shown in FIG. 6, if the depression BPA of the brake pedal 8 is smaller than the threshold value BPAth so that the answer of step S3 is NO, the routine progresses to step S5 to absorb the torque T2 of the output torque Te of the engine 1 by the first motor 2. Specifically, in the case of launching the vehicle Ve by the "quasi-stall stating", the routine progresses to step S5 if the brake pedal 8 is released while depressing the accelerator pedal 7. By contrast, in the case of launching the vehicle Ve by the "WOT starting", the routine progresses to step S5 immediately after depressing the accelerator pedal 7.

After step S5, or simultaneously with step S5, the second motor 21 generates torque at step S11, and the output torque of the second motor 21 is delivered to the drive wheels 3 to generate a drive force for launching the vehicle Ve.

Then, it is determined at step S12 whether a speed of the vehicle Ve is equal to or higher than a threshold speed Vth. In other words, at step S12, it is determined whether a speed difference between the friction plates 6a and 6b of the clutch 6 is reduced to a value suitable to start engagement of the clutch 6. To this end, the threshold speed Vth is set based on a result of a simulation or an experiment. Specifically, if the speed of the vehicle Ve is lower than the threshold speed Vth, the controller 9 determines that the speed difference between the friction plates 6a and 6b of the clutch 6 is not reduced to the value suitable to start engagement of the clutch 6. By contrast, if the speed of the vehicle Ve is equal to or higher than the threshold speed Vth, the controller 9 determines that the speed difference between the friction plates 6a and 6b of the clutch 6 is reduced to the value suitable to start engagement of the clutch 6.

If the speed of the vehicle Ve is lower than the threshold speed Vth so that the answer of step S12 is NO, the routine returns to step S5 to repeat steps S5 and S11 until the speed difference between the friction plates 6a and 6b of the clutch 6 is reduced to the value suitable to start engagement of the clutch 6.

By contrast, if the speed of the vehicle Ve is equal to or higher than the threshold speed Vth, the routine progresses to step S13 to start engaging the clutch 6 gradually. Consequently, the output torque Te of the engine 1 is delivered to the drive wheels 3 in addition to the output torque of the second motor 21 to generate a larger drive force.

Then, it is determined at step S14 whether the clutch 6 is engaged completely. As described, the engagement of the clutch 6 is started at step S13, and a torque transmitting capacity of the clutch 6 is increased gradually until the clutch 6 is engaged completely.

If the clutch 6 has not yet been engaged completely so that the answer of step S14 is NO, the routine returns to step S13 to continue engagement of the clutch 6. By contrast, if the clutch 6 has been engaged completely so that the answer of step S14 is YES, the routine progresses to step S15 to terminate the torque absorbing control.

As a result of engaging the clutch 6 completely and terminating the torque absorbing control, the engine 1 is allowed to generate the maximum output power to accelerate the vehicle Ve sharply. In this situation, the first motor 2 may be operated as a motor, and an output torque of the first motor 2 may also be delivered to the drive wheels 3 together with the output torque Te of the engine 1. Consequently, the drive force can be increased to accelerate the vehicle Ve more promptly. Thereafter, the routine returns.

Figure 7A:
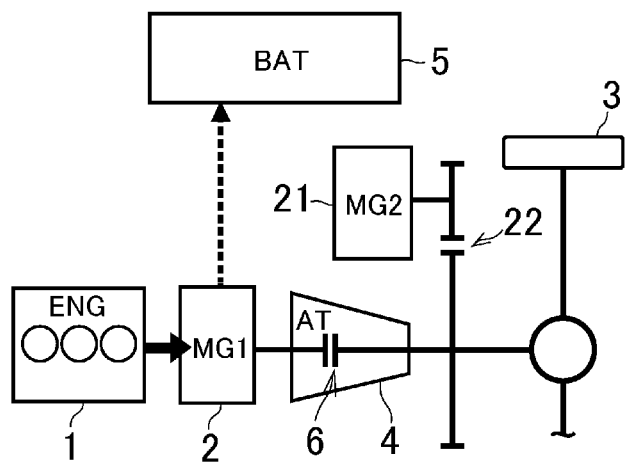
FIGS. 7A, 7B and 7C are schematic illustrations indicating flows of torque and electricity during execution of the routine shown in FIG. 6.
Figure 7B:
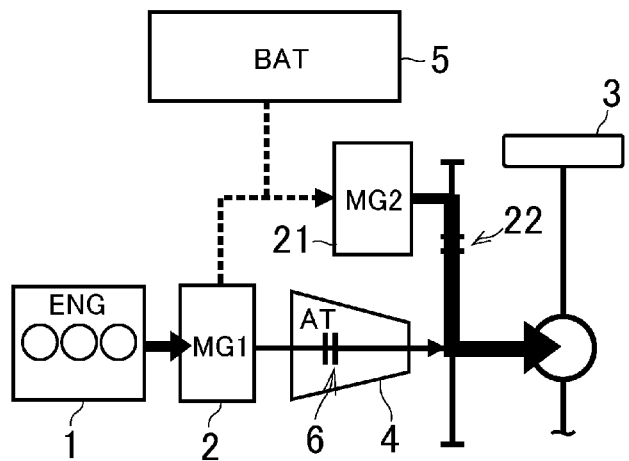
Figure 7C:
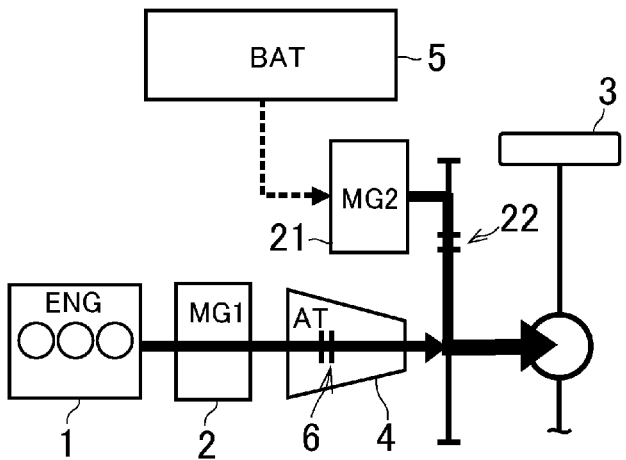

FIGS. 7A, 7B and 7C show a flow of the torque between the prime mover and the drive wheels 3 and a flow of the electricity among the first motor 2, the second motor 21, and the battery 5 when launching the vehicle Ve by the routine shown in FIG. 6. FIG. 7A shows a situation before launching the vehicle Ve, and in the situation shown in FIG. 7A, the clutch 6 is still disengaged. Specifically, in the case of launching the vehicle Ve by the "quasi-stall stating", both of the accelerator pedal 7 and the brake pedal 8 are depressed in the situation shown in FIG. 7A. By contrast, in the case of launching the vehicle Ve by the "WOT starting", the accelerator pedal 7 has just been depressed immediately before starting the engagement of the clutch 6 in the situation shown in FIG. 7A.

In the situation shown in FIG. 7A, the vehicle Ve has not yet been launched, and the second motor 21 has not yet generated a torque. Accordingly, the situation shown in FIG. 7A is identical to the situation shown in FIG. 4C.

FIG. 7B shows a situation immediately after launching the vehicle Ve, and in the situation shown in FIG. 7B, the clutch 6 has not yet been engaged completely, that is, the clutch 6 still engaged partially while causing slip. Specifically, in the case of launching the vehicle Ve by the "quasi-stall stating", the brake pedal 8 is released while depressing the accelerator pedal 7 in the situation shown in FIG. 7B. By contrast, in the case of launching the vehicle Ve by the "WOT starting", the accelerator pedal 7 has just been depressed in the situation shown in FIG. 7B.

In the routine shown in FIG. 6, electricity is supplied from the battery 5 to the second motor 21 to generate torque when the brake pedal 8 is released to launch the vehicle Ve by the "quasi-stall stating", or immediately after the accelerator pedal 7 is depressed to launch the vehicle Ve by the "WOT starting". The torque generated by the second motor 21 is delivered to the drive wheels 3 to launch the vehicle Ve. In this situation, the second motor 21 may also be operated by directly supplying the electricity generated by the first motor 2 to the second motor 21.

Engagement of the clutch 6 is started when the speed of the vehicle Ve is raised higher than the threshold speed Vth after launching the vehicle Ve. Consequently, as shown in FIG. 7B, the first motor 2 is operated as a generator continuously by the torque T1 or T2 as a part of the output torque Te of the engine 1. In other words, the output torque Te of the engine 1 is partially absorbed by the first motor 2. The remaining part of the output torque Te of the engine 1 is delivered to the clutch 6 by engaging the clutch 6 while causing slip so that the drive force is generated gradually. According to the routine shown in FIG. 6, the vehicle Ve has already been launched before starting the engagement of the clutch 6, that is, the speed difference between the friction plates 6a and 6b of the clutch 6 has already been reduced with an increase in the speed of the vehicle Ve. For this reason, damage on the clutch 6 may be limited even if the clutch 6 is engaged while causing slip. In addition, in order to protect the clutch 6, the torque to be delivered to the clutch 6 is suppressed smaller than the upper limit value Tmax. For this reason, the vehicle Ve can be launched by the part of the output torque Te of the engine 1 that is increased in advance while protecting the clutch 6. That is, the vehicle Ve without having a torque converter can be launched by the "quasi-stall stating" or the "WOT starting".

FIG. 7C shows a situation in which the clutch 6 is engaged completely after launching the vehicle Ve. As described, the engagement of the clutch 6 is completed when the speed difference between the friction plates 6a and 6b of the clutch 6 becomes zero.

When the clutch 6 is engaged completely, the output torque Te of the engine 1 is delivered entirely to the clutch 6. Consequently, the vehicle Ve can be launched and accelerated by all of the output power of the engine 1 in addition to the torque generated by the second motor 21. For this reason, the drive force to launch the vehicle Ve can be increased, and the vehicle Ve can be accelerated more promptly.

Although the above exemplary embodiments of the present disclosure have been described, it will be understood by those skilled in the art that the present disclosure should not be limited to the described exemplary embodiments, and various changes and modifications can be made within the scope of the present disclosure.

What is claimed is:
1. A hybrid vehicle, comprising:
an engine;
a first motor that is arranged on an output side of the engine to be operated by at least part of an output torque of the engine to generate electricity;
a drive wheel;
a second motor that generates a torque to be delivered to the drive wheel to generate a drive force;
a starting clutch that selectively allows and interrupts power transmission between the first motor and the drive wheel;
an accelerator pedal that is operated by a driver;
a brake pedal that is operated by the driver; and
a controller that controls the engine, the first motor, and the starting clutch, wherein
at least part of torque of the engine and the first motor is delivered to the drive wheel to generate a drive force by engaging the starting clutch,
the engine generates a torque in accordance with a depression of the accelerator pedal,
the controller is configured to execute a torque absorbing control to reduce the torque of the engine to be delivered to the starting clutch by operating the first motor by the torque of the engine, when the starting clutch is disengaged and the depression of the accelerator pedal is greater than a threshold value,
the controller is configured to execute the torque absorbing control when the starting clutch is disengaged, the depression of the accelerator pedal is greater than the threshold value, and a depression of the brake pedal is greater than a threshold value,
the controller is configured to generate a torque by the second motor to generate a drive force while reducing the torque of the engine to be delivered to the starting clutch when the depression of the brake pedal is reduced smaller than the threshold value during execution of the torque absorbing control, and
the controller is configured to start engagement of the starting clutch after launching the hybrid vehicle by the drive force generated by the torque of the second motor.
2. The hybrid vehicle as claimed in claim 1, wherein the controller is further configured to execute the torque absorbing control such that the torque of the engine to operate the first motor becomes smaller than an upper limit value.

3. The hybrid vehicle as claimed in claim 2, wherein the controller is further configured to terminate the torque absorbing control when the starting clutch is engaged completely.

4. The hybrid vehicle as claimed in claim 1, wherein the controller is further configured to terminate the torque absorbing control when the starting clutch is engaged completely.

5. A hybrid vehicle, comprising:
an engine;
a first motor that is arranged on an output side of the engine to be operated by at least part of an output torque of the engine to generate electricity;
a drive wheel;
a second motor that generates a torque to be delivered to the drive wheel to generate a drive force;
a starting clutch that selectively allows and interrupts power transmission between the first motor and the drive wheel;
an accelerator pedal that is operated by a driver;
a brake pedal that is operated by the driver; and
a controller that controls the engine, the first motor, and the starting clutch, wherein
at least part of torques of the engine and the first motor is delivered to the drive wheel to generate a drive force by engaging the starting clutch,
the engine generates a torque in accordance with a depression of the accelerator pedal,
the controller is configured to execute a torque absorbing control to reduce the torque of the engine to be delivered to the starting clutch by operating the first motor by the torque of the engine, when the starting clutch is disengaged and the depression of the accelerator pedal is greater than a threshold value,
the controller is configured to execute the torque absorbing control while starting engagement of the starting clutch to generate a drive force, when the starting clutch is disengaged, the depression of the accelerator pedal is greater than the threshold value, and a depression of the brake pedal is smaller than a threshold value,
the controller is configured to generate a torque by the second motor to generate a drive force while executing the torque absorbing control, when the starting clutch is disengaged, the depression of the accelerator pedal is greater than the threshold value, and the depression of the brake pedal is smaller than the threshold value, and
the controller is configured to start engagement of the starting clutch after launching the hybrid vehicle by the drive force generated by the torque of the second motor.

6. The hybrid vehicle as claimed in claim 5, wherein the controller is further configured to execute the torque absorbing control such that the torque of the engine to operate the first motor becomes smaller than an upper limit value.

7. The hybrid vehicle as claimed in claim 6, wherein the controller is further configured to terminate the torque absorbing control when the starting clutch is engaged completely.

8. The hybrid vehicle as claimed in claim 5, wherein the controller is further configured to terminate the torque absorbing control when the starting clutch is engaged completely.

* * * * *